Figure 1:
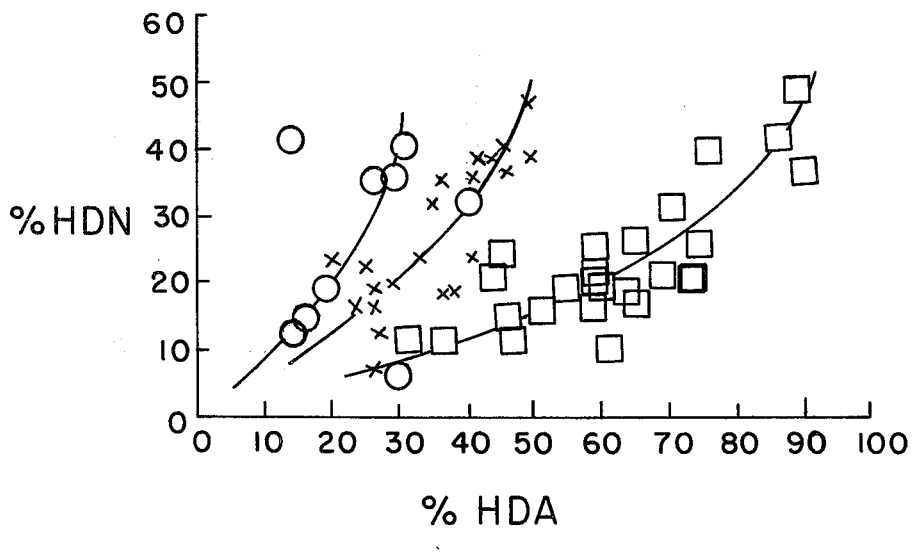

United States Patent [19]

Hamner et al.

[11] 3,928,176

[45] Dec. 23, 1975

[54] HEAVY CRUDE CONVERSION

[75] Inventors: Glen P. Hamner; Mamerto G. Luzarraga; Alto Nelson Stuckey, Jr., all of Baton Rouge, La.

[73] Assignee: Exxon Research and Engineering Company, Linden, N.J.

[22] Filed: Apr. 1, 1974

[21] Appl. No.: 456,989

[52] U.S. Cl. .............................. 208/97; 208/254 H
[51] Int. Cl.² ......................................... C10G 37/00
[58] Field of Search ..................... 208/97, 254 H

[56] References Cited
UNITED STATES PATENTS

| | | | |
|---|---|---|---|
| 2,441,297 | 5/1948 | Stirton | 208/136 |
| 3,125,510 | 3/1964 | Tupman et al. | 208/254 H |
| 3,294,659 | 12/1966 | O'Hara | 208/254 H |
| 3,393,148 | 7/1968 | Bertolacini et al. | 208/254 H |
| 3,446,730 | 5/1969 | Kearns et al. | 208/254 H |
| 3,493,517 | 2/1970 | Jaffe | 208/254 H |
| 3,530,066 | 9/1970 | Kuwata et al. | 208/254 H |
| 3,749,664 | 7/1973 | Mickelson | 208/254 H |

*Primary Examiner*—Delbert E. Gantz
*Assistant Examiner*—James W. Hellwege
*Attorney, Agent, or Firm*—Lewellyn A. Proctor

[57] ABSTRACT

A process for the hydroconversion and hydrodenitrogenation of 1050°F.+ heavy crudes and residua. Hydroconversion of the 1050°F.+ materials is conducted in a first or initial reaction zone with a large pore catalyst to provide increased 1050°F.—or gas oil yield of high nitrogen content, and the product is treated in a subsequent reaction zone with an aluminum phosphate catalyst. The process combination provides overall increased gas oil yield of low nitrogen content.

20 Claims, 2 Drawing Figures

HYDROTREATING TIA JUANA RESIDUUM (600-725°F., 0.64 W/HR./W, 1000 PSIG, 4000 SCF $H_2$/BBL.)

NITROGEN REMOVAL VS. ASPHALTEN REMOVAL

○ $AlPO_4/Al_2O_3$ - 40 Å P.D. BASE

✕ $Al_2O_3$ - 60-80 Å P.D. BASE

□ $Al_2O_3$ - 200-350 Å P.D. BASE

HEAVY CRUDE CONVERSION

Aluminum phosphate catalysts useful in hydroprocessing processes, i.e., those involving hydrogenation, hydrofining, hydrodesulfurization, hydroforming, hydrocracking and hydrodenitrogenation reactions, have been known for many years. These catalysts are formed by incorporation of a metal, or metals, with aluminum phosphate, e.g., by cogellation methods or by impregnation of an alumina phosphate base with a salt solution of a transition group metal, or metals, particularly the Group VIB or Group VIII metals (notably the nonnoble metals), or admixtures of the Group VIB and Group VIII metals, with each other or with other metals. A technique for making these catalysts for such usage is described, e.g., by reference to U.S. Pat. No. 3,342,742. Reference is also made to U.S. Pat. Nos. 2,440,236; 2,441,297; 3,051,648; 3,320,331; 3,287,280; 3,493,517 and 3,697,550. In general, aluminum phosphate catalysts have proved somewhat more effective for nitrogen removal than alumina catalysts which contain no phosphate component.

Whereas the hydrodenitrogenation of various hydrocarbon feedstocks has been achieved by passage over such catalysts at catalytic reaction conditions, such processes are nonetheless far less effective than desirable. It is particularly difficult to achieve a high degree of nitrogen removal even of the relatively light gas oil fractions, in hydroprocessing a heavy crude or residua. Such hydrocarbon materials are particularly difficult to process, especially unconventional materials such as Athabasca tar sands, Canadian and Venezuelan heavy oils and Venezuelan heavy tars, shale and coal liquid products because, inter alia, of their exceptionally high content of 1050°F.+ materials. The so-called unconventional hydrocarbon materials differ from conventional heavy crudes and residual particularly in that they have (1) very high Conradson carbon (i.e., "Con carbon") or carbon-to-hydrogen ratios (i.e., relatively high carbon and low hydrogen content), (2) very high metals content, particularly as regards the amount of nickel and vanadium, (3) they are ultra-high in their content of materials boiling above 1050°F., e.g., asphaltenes, and even (4) contain considerable amounts of sand and scale. Properties which readily distinguish these new materials from conventional crudes and residua are thus: high metals, high asphaltenes, high carbon:hydrogen ratios, and a high volume percent of hydrocarbons boiling above 1050°F. The high carbon:hydrogen (i.e., Con carbon) ratios are considerably higher than that of any presently usable hydrocarbon liquids. The presence of the greater amounts of metals and the higher carbon content of the heavy crudes, in particular, makes any considerations regarding the processing of these materials very difficult and quite expensive.

In hydroprocessing heavy crudes and residua, whether conventional or unconventional, it is particularly important to reduce the nitrogen content of such materials to render the gas oil fractions thereof suitable as feeds for catalytic cracking operations. The catalysts used in "cat cracking" operations provide acid sites which facilitate cracking of the hydrocarbon feed at the conditions of operation. The acid sites are apparently neutralized by nitrogen which acts as a poison, deactivation of the catalyst progressing in direct proportion to the duration of the operation, and in proportion to the amount of nitrogen contained in the cat cracker feed. In cat cracking operations, it is conventional practice to maintain the activity of the catalyst at desired yield levels by progressive increase in the severity of the reaction conditions to the extent that this is economically feasible, after which time the catalyst must be replaced by fresh or regenerated catalyst. The effect of nitrogen in terms of catalyst activity maintenance and yield levels is thus an important practical consideration in petroleum refining operations.

Despite a sharp increase in the demand for cat cracker feedstocks, having very low nitrogen content, it requires considerable effort to treat petroleum feedstocks, especially heavy crudes and residua, to remove all but trace amounts of nitrogen. The effectiveness of aluminum phosphate catalysts is quite limited, particularly in the hydroprocessing of heavy crudes and residua. Perhaps this is due in large part to the relatively small pore size distributions possessed by phosphate catalysts. Large pore phosphate catalysts are unknown, and the treatment of heavy crudes and residua with such catalysts are believed by Applicants less effective than desired because the relatively large asphaltene molecules cannot enter into the catalyst pores, and hence do not come into contact with a large number of active catalyst reaction sites. In any regard, for whatever reason, phosphate catalysts are particularly lacking in their effectiveness in treating heavy crudes and residua. Hence, there is an increasing need for the development of catalysts and process techniques which enable enhanced catalyst activity maintenance with corresponding increases in effective on-stream hydrodenitrogenation time.

Accordingly, it is an object of the present invention to provide an improved gas oil hydrodenitrogenation process.

It is a specific object of the present invention to provide a multiple stage, particularly a two-stage, hydrodenitrogenation process for treating heavy crudes and residua which affords high catalyst activity maintenance.

These and other objects are accomplished by the present invention which provides a process combination admirably suitable for the hydrodenitrogenation of heavy crudes and residua comprising contacting said heavy crude or residua in an initial or first reaction zone comprising one or more stages (and in one or more reactors) wherein a whole heavy crude or residua feed containing 1050°F.+ materials, especially one having the following characteristics,

|  | Operable Range | Preferred Range |
|---|---|---|
| Gravity, °API | −5 to 20 | 0–14 |
| Heavy Metals (Ni & V), ppm | 5–1000 | 200–600 |
| 1050°F.+, Wt.% | 10–100 | 40–100 |
| Asphaltenes (C$_5$ insoluble), Wt.% | 5–50 | 15–30 |
| Nitrogen, Wt.% | 0.1–5 | 0.5–2 |
| Con Carbon, Wt.% | 5–50 | 10–30 | is contacted with a large pore catalyst, in the presence of hydrogen at severities sufficient to convert at least about 30 percent by weight and preferably from about 40 percent to about 60 percent of the 1050°F.+ materials of the crude or residua present to 1050°F.− materials, remove at least about 75 percent, and preferably from about 80 to about 95 percent, by weight of the metals, preferably producing a product having the following characteristics:

|  | Operable Range | Preferred Range |
|---|---|---|
| Gravity, °API | 14–30 | 15–25 |
| Heavy Metals (Ni & V), ppm | 10–100 | 40–80 |
| 1050°F.+, Wt.% | 10–50 | 25–40 |
| Asphaltenes (C$_5$ insoluble), Wt.% | 3–20 | 5–15 |
| Nitrogen, Wt.% | 0.07–2.5 | 0.25–1.5 |
| Con Carbon, Wt.% | 3–20 | 5–10 |

The total effluent, or the gas oil fraction of this product, is suitable for further contact with an aluminum phosphate catalyst, in the presence of hydrogen, in a second or subsequent reaction zone comprising one or more stages (and in the same, or one or more additional reactors) at conditions sufficient to produce a gas oil fraction, or product capable of yielding a distillate suitable for use as a cat cracker feed.

In conducting the reaction within the second zone, a small pore aluminum phosphate catalyst is employed, the reaction being conducted at severities sufficient to hydrodenitrogenate the 1050°F.− or gas oil fraction, preferably at least about 30 percent, and more preferably from about 40 percent to about 90 percent of the nitrogen (based on the weight of the total nitrogen contained in the reaction mixture) which is eliminated as ammonia. Generally, there is little or no reduction, in this stage of the metals content, and little or no reduction of the Con carbon from the feed (based on the weight of feed entering said second reaction zone). Preferably, a gas oil product having the following characteristics is produced:

|  | Operable Range | Preferred Range |
|---|---|---|
| Gravity, °API | 18–30 | 20–28 |
| Heavy Metals (Ni & V), ppm | <1 | <0.05 |
| Nitrogen, ppm | 50–500 | 100–400 |
| Con Carbon, Wt.% | 0.5 to 1.0 | <0.5 |

In conducting the reaction within the initial or first reaction zone, a catalyst having an essential combination of properties is employed as relates to pore size (or pore size distribution), surface area and pore volume, this providing enhanced selectivity for the conversion and demetallization of whole heavy crudes and residua, in the presence of added hydrogen, which contains relatively large quantities of 1050°F.+ materials, i.e., asphaltenes (C$_5$ insoluble) and other large hydrocarbon molecules, which are effectively converted to lower molecular weight products. The desirable volume increase in the yield of gas oil, as a result of the conversion of 1050°F.+ materials to 1050°F.− materials, however, is admirably suitable for reducing the nitrogen content of such product, and also suitable for the efficient conversion, demetallization and Con carbon reduction of hydrocarbon materials, particularly of a feed of character similar to the product resultant from a hydroconversion process utilizing said first catalyst. Conversion, as used herein, thus requires chemical alteration of hydrocarbon molecules to form lower molecular weight molecules. With regard to the conversion taking place in said first reaction zone, hydrocarbon molecules boiling above 1050°F.+ are cracked to hydrocarbon molecules boiling below 1050°F. (i.e., 1050°F.−), and it is measured by the weight decrease in the amount of 1050°F.− hydrocarbons contained in the original feed times 100, divided by the amount of 1050°F.+ material originally present in the feed. Little or no conversion occurs in the second reaction zone.

The catalysts employed in the first reaction zone comprise catalytically active amounts of hydrogenation component which includes a Group VIB or Group VIII metal (especially, a Group VIII non-noble metal), or both (Periodic Table of the Elements, E. H. Sargent and Co., Copyright 1962 Dyna-Slide Co.), particularly molybdenum or tungsten of Group VIB, and cobalt or nickel of Group VIII, and preferably a Group VIB and Group VIII metal in admixture one metal with the other, or with other metals, or both, composited with a refractory inorganic support, notably a porous inorganic oxide support, particularly alumina, or more particularly gamma alumina. The catalyst includes a combination of properties comprising at least about 50 percent, and more preferably at least about 75 percent, of its total pore volume of absolute diameter within the range of about 200A (Angstrom units) to about 300A, and less than about 20 percent, preferably less than 10 percent, and more preferably less than 5 percent, of its total pore volume of absolute diameter within the range of 0 to 100A, a surface area ranging at least about 200 m$^2$/g to about 600 m$^2$/g, and preferably at least about 250 m$^2$/g to about 450 m$^2$/g, and a pore volume ranging from about 0.8 to about 3.0 cc/g, and preferably from about 1.1 to about 1.9 cc/g (B.E.T.).

The following tabulation describes the pore size distribution, as percent of total pore volume, of preferred large pore catalysts useful in the first reaction zone.

| Distribution of Pore Diameters[1] | Preferred | More Preferred |
|---|---|---|
| 0–100A | <10% | <5% |
| 200–300A | >50% | >75% |
| 400A+[2] | <20% | <10% |

[1]Measured by nitrogen adsorption isotherm, wherein nitrogen adsorbed is at various pressures. Technique described in Ballou, et al. Analytical Chemistry, Vol. 32, April 1960, using Aminco Adsorptomat [(Catalogue No. 4–4680) and Multiple Sample Accessory (Catalogue No. 4–4685) Instruction No. 861-A] which uses the principle of adsorption and desorption of gas by a catalyst specimen at the boiling point of nitrogen.
[2]Not essential, but desirable.

The first zone of large pore catalyst is generally employed in one or more stages of a reactor, or reactors, aligned in series (which can and usually does include one or more stand-by or swing reactors as desired), after having been reduced and sulfided generally in situ within the reactor. The first reaction zone is operated under conditions, the major variables of which are tabulated for convenience, as follows:

|  | Operable | Preferred |
|---|---|---|
| Temperature, °F., E.I.T.[1] |  |  |
| Start-of-Run | 700 | 750 |
| End-of-Run | 850 | 800 |
| Pressure, psi | 2000–10,000 | 2000–5000 |
| Hydrogen Rate, SCF/B | 3000–20,000 | 3000–10,000 |
| Space Velocity, LHSV | 0.25–5.0 | 0.5–1.0 |

[1]Equivalent Isothermal Temperature (E.I.T.)

The catalyst employed in the second reaction zone contains a metal (or metals) hydrogenation component and at least 30 percent, preferably 30 percent to about 100 percent, aluminum phosphate, more preferably from about 50 percent to about 80 percent aluminum phosphate, based on the weight of the catalyst (dry basis) exclusive of the hydrogenation component. To effect optimum nitrogen removal from the feed, it is particularly desirable to utilize a catalyst which contains above about 50 percent aluminum phosphate, and most particularly between about 70 percent and about 80 percent aluminum phosphate.

The preferred small pore aluminum phosphate catalyst includes a combination of properties comprising at least about 90 percent, and preferably at least about 99 percent of its total pore volume of absolute diameter within the range of about 15A to about 100A, and less than about 5%, and preferably 2% of its total pore volume of absolute diameter within the range of about 80A to about 150A, a surface area ranging from about 200 m²/g to about 600 m²/g, preferably from about 350 m²/g to about 500 m²/g, and a pore volume ranging from about 0.25 to about 0.75 cc/g, and preferably from about 0.4 to about 0.8 cc/g (B.E.T.).

The following tabulation shows the pore size distribution, as percent of total pore volume, of preferred second reaction zone catalysts, to wit:

| Distribution of Pore Diameters[1] | Preferred | More Preferred |
|---|---|---|
| 20A to 30A | 20% | 10% |
| 30A to 40A | 30% | 40% |
| 40A to 50A | 25% | 40% |
| 50A to 60A | 15% | 10% |

[1]Measured by nitrogen adsorption isotherm, wherein nitrogen adsorbed is at various pressures. Technique described in Ballou, et al, Analytical Chemistry, Vol. 32, April 1960, using Aminco Adsorptomat [(Catalogue No. 4-4680) and Multiple Sample Accesory (Catalogue No. 4-4685) Instruction No. 861-A] which uses the principle of adsorption and desorption of gas by a catalyst specimen at the boiling point of nitrogen.

The second reaction zone is operated under conditions, the major variables of which are tabulated below for convenience:

| | Operable | Preferred |
|---|---|---|
| Temperature, °F., E.I.T. | | |
| Start-of-Run | 600 | 700 |
| End-of-Run | 800 | 750 |
| Pressure, psi | 500–5000 | 1500–3000 |
| Hydrogen Rate, SCF/B | 1000–10,000 | 2000–4000 |
| Space Velocity, LHSV | 0.2–5 | 0.5–2.0 |

The hydrogenation component of both the large pore first reaction zone catalysts and the small pore aluminum phosphate, or second reaction zone catalysts can be the same or different qualitatively or quantitatively, and is comprised of a metal, or metals, hydrogenation component selected from Group VIB or Group VIII, or both, the metals generally existing as oxides, sulfides, reduced forms of the metal or as mixtures of these and other forms. Suitably, the composition of the catalysts comprises from about 5 to about 50 percent, preferably from about 15 to about 25 percent (as the oxide) of the Group VIB metal, and from about 1 to about 12 percent, preferably from about 4 to about 8 percent (as the oxide) of the Group VIII metal, based on the total weight (dry basis) of the composition. The preferred active metallic components, and forms thereof, comprise an oxide or sulfide of nickel or cobalt of Group VIII, preferably a mixture of one of said Group VIB and one of said Group VIII metals, admixed one with the other and inclusive of third metal components of Group VIB, VIII and other metals.

The preferred catalysts in each of the reaction zones are constituted of an admixture of cobalt and molybdenum, or nickel and molybdenum. A nickel-molybdenum catalyst is particularly effective in removing nitrogen from the 1050°F.— component of the feed. Other suitable Group VIB and VIII metals include, for example, chromium, platinum, palladium, iridium, osmium, ruthenium rhodium, and the like. The inorganic oxide supports used in the first reaction zone comprises a large pore support such as alumina, silica, zirconia, magnesia, boria, titania, ceria, thoria, and the like. The preferred support is alumina, preferably gamma alumina. These same support materials can be employed in the second reaction zone in admixture with aluminum phosphate.

The small pore catalyst always includes an aluminum phosphate component, preferably in concentration ranging from about 30 to about 100 percent, more preferably from about 50 to about 80 percent, based on the total weight (dry basis) of the composition (exclusive of metal components). The catalyst compositions can be in the form of beads, aggregates of various particle sizes, extrudates, tablets or pellets, depending upon the conditions to which the catalyst is to be exposed.

Particularly preferred catalysts for either or both of the reaction zones are composites of nickel or cobalt oxide with molybdenum, used in the following approximate proportions: from about 1 to about 12 weight percent, preferably from about 4 to about 8 weight percent of nickel or cobalt oxides; and from about 5 to about 50 weight percent, preferably from about 15 to about 25 weight percent of molybdenum oxide on a suitable support, such as alumina in the first reaction zone, and aluminum phosphate employed in the second reaction zone. The catalysts are sulfided to form the most active species.

The Group VIB and Group VIII metal components, admixed one component with the other or with a third or greater number of metal components, can be composited or intimately associated with the porous inorganic oxide support or carrier by various techniques known to the art, such as by impregnation of a support with the metals by ion exchange, coprecipitation of the metals with the alumina (and phosphate) in the sol or gel form, and the like. For example, a preformed alumina support can be impregnated by an "incipient wetness" technique, or technique wherein a metal, or metals, is contained in a solution in measured amount and the entire solution is absorbed into the support which is then dried, calcined, etc., to form the catalyst. Also, for example, the catalyst composite can be formed from a cogel by adding together suitable reagents such as salts of the Group VIB or Group VIII metals, or both, and ammonium hydroxide or ammonium carbonate, and a salt of aluminum such as aluminum chloride or aluminum sulfate to form aluminum hydroxide. The aluminum hydroxide containing the salts of the Groups VIB or Group VIII metals, or both, and additional metals, if desired, can then be heated, dried, formed into pellets, or extruded, and then calcined in nitrogen or other generally inert atmosphere. Catalysts formed from cogels do not possess pore size distributions as uniform as those formed by impregnation methods.

The catalysts can be used in the reaction zones as fixed beds, ebullating beds or in slurry form within beds. When used in the form of fixed beds, the particle size diameter of the catalysts generally ranges from about 1/32 to about 150 inch, preferably about 1/16 inch. When used as ebullating beds, the catalysts generally range about 1/32 inch diameter and smaller, and when used as slurry beds the particle sizes generally range from about 100 to about 400 microns. The density of the large pore catalyst generally ranges from about 0.2 to about 0.8 g/cc, preferably from about 0.4 to about 0.6 g/cc, and that of the small pore catalyst ranges from about 0.3 to about 1.0 g/cc, preferably from about 0.5 to about 0.8 g/cc.

It is believed that the pore size of the large pore catalyst is selectively adsorptive as regards asphaltenes which range in size from relatively small to very large in terms of their molecular weight and physical size. The range of pores of about 200–300A diameter are thus believed to admit asphaltenes of small and even relatively large sizes, with hydrogen, into contact with a great number of reaction sites due to this penetration. The high number of reaction sites is thus drastically increased vis-a-vis conventional catalysts because of the unusually high surface area and pore volume which provide essentially optimum hydroconversion of these molecules as they penetrate into the interior of the catalyst particles, and are caused to react by the conditions imposed thereon. This pore size range facilitates egress of the reacted moieties, or by-products of the reaction. On the other hand, pores of smaller diameter either do not permit ingress of relatively large amounts of asphaltenes due to the very large size, or the egress of the asphaltenes which are admitted into the particles is hampered by the small size of the pores, or both. Conversely, pores of larger diameter admit certain types of very large asphaltenes which lay down and block the active sites such that the admitted asphaltenes of small to relatively large size cannot properly react and hence the catalyst all too soon becomes inactivated. Whereas the nitrogen content of the reaction mixture, or product of the first reaction zone, is increased due to the breakdown of the high molecular weight relatively high nitrogen-bearing asphaltenes, this catalyst admirably serves to hydrodepolymerize the 1050°F.+ materials, increase the gas oil yield, and also to hydrodesulfurize and even hydrodenitrogenate the feed, albeit there is an increase in the overall nitrogen content of the gas oil product.

The net effect of the overall reactions is that the very large molecules, i.e., those boiling in the 1050°F.+ range, are effectively cracked in the first reaction zone, a large amount of the 1050°F.+ boiling range hydrocarbons being converted to gas oil, or hydrocarbon materials boiling in the 1050°F.− range. Thus, there is a net increase in the amount of gas oil that is produced. The cracked 1050°F.+ hydrocarbons, however, produce a gas oil fraction which contains considerable nitrogen and hence, albeit the large pore catalyst hydrodenitrogenates the gas oil to a degree, there is nonetheless an undesirable net increase of nitrogen in the gas oil fraction. The nitrogen, however, is effectively removed by the reaction produced by the use of the small pore phosphate catalyst in the second reaction zone when the effluent from the first reaction zone is transferred thereto. Moreover, the relatively large molecules having been reduced in size in the first zone now more readily enter into the pores of the small pore aluminum phosphate catalyst, more effectively contact reactive sites within the particulate catalyst mass, and nitrogen is removed, particularly from the gas oil fraction, or fraction boiling below about 1050°F., and more particularly from the gas oil fraction boiling within the range of from about 350 to 950°F. The overall net effect is that the original feed is converted to produce a considerably higher yield of low nitrogen content gas oil than otherwise would have been possible by operation of a process which employed one or two stages of the same large pore catalyst per se, the small pore catalyst per se, or by a similar two-stage process wherein the small pore phosphate catalyst is employed in a stage in advance of the stage containing the large pore catalyst.

The following examples illustrate the practice of this invention. All percentages and parts are by weight except as otherwise specified.

EXAMPLE 1

A large pore alumina catalyst and a small pore alumina phosphate catalyst were prepared and evaluated at varied conditions in a two-stage reactor system utilizing a high metals, high nitrogen-containing Tia Juana atmospheric residuum as feed to the first stage of the reactor which contained a portion of the large pore alumina catalyst. The effluent from the first stage was fed to a second stage of the reactor which contained a portion of the small pore alumina phosphate catalyst, and evaluated at varying conditions. The effluent from the second stage of the reactor was then distilled to separate a gas oil fraction. Data relating to conditions, analyses of feeds and products, and the overall results achieved are presented below.

The Tia Juana atmospheric residuum feed which was fed to the first stage or first reaction zone is as characterized in Table I, below:

TABLE I

| Inspections | |
|---|---|
| Gravity, °API | 15.4 |
| Sulfur, Wt.% | 2.15 |
| Nitrogen, Wt.% | 0.385 |
| Con Carbon, Wt.% | 11.6 |
| Asphaltenes, Wt.% | 11.5 |
| Metals, ppm | |
|   Vanadium | 285 |
|   Nickel | 35 |
| Distillation Data, Wt.% | |
|   IBP — 650°F. | 5.0 |
|   650–975°F. | 38.0 |
|   975°F.+ | 57.0 |
| ASTM D-1160 | |
|   IBP, °F. | 505 |
|   5% | 622 |
|   10% | 694 |
|   20% | 772 |
|   30% | 840 |
|   40% | 905 |
|   50% | 978 |
|   FBP. °F. | 1047 |
| % Recovery | 58.5 |
| % Residue | 41.5 |

The large pore catalyst contained in the first stage of the reactor is characterized as described in Table 2, below:

TABLE 2

| Catalyst No. | Base | CoO, % | MoO$_3$, % | S.A., m$^2$/g | Pore Diameter (Av.), A | Pore Volume cc/g |
|---|---|---|---|---|---|---|
| 30 | Al$_2$O$_3$ | 7.0 | 24.0 | 343 | 131 | 1.12 |

Process conditions of the first stage operation, and the results obtained, are shown in Table 3, as follows:

TABLE 3

| Balance No. | 1 | 2 | 3 | 4 | 5 | 6 |
|---|---|---|---|---|---|---|
| Time on Oil, Days | 1 | 2 | 3 | 6 | 8 | 10 |
| Process Conditions | | | | | | |
| Temperature, °F. | 500 | 600 | 700 | 723 | 750 | 800 |
| Pressure, psi | | | | 2250 | | |
| Feed Rate, W/Hr./W | | | | 0.69 | | |
| $H_2$ Gas Rate, SCF/Bbl. | | | | 4000 | | |
| Total Hours on Stream | 20 | 44 | 65 | 155 | 201 | 246 |
| Material Bal. ex Gas & Coke, Wt.% | 75.6 | 104.2 | 99.1 | 96.9 | 94.6 | 90.1 |
| Liquid Product Inspections | | | | | | |
| °API | 18.1 | 18.6 | 21.4 | 22.1 | 22.9 | 28.2 |
| Sulfur, Wt.% | 1.47(2.18)* | 0.945(2.10)* | 0.263(2.13)* | 0.221(2.14)* | 0.179(2.05)* | 0.059(2.18)* |
| Nitrogen, Wt.% | 0.3105 | — | 0.189 | 0.194 | — | 0.096 |
| Asphaltenes, Wt.% | 7.28 | 5.24 | 3.94 | 0.69 | 0.11 | 0.35 |
| Metals, ppm | | | | | | |
| V | 148(253)* | 129(268)* | 41.3(272)* | 21.5(270)* | 4.1(266)* | 3.7(275)* |
| Ni | 25.6(35.8)* | 22.4(34.8)* | 10.6(37.9)* | 7.7(37.7)* | 4.6(35.6)* | 3.1(37.3)* |
| % HDS | 32.6 | 55.0 | 87.7 | 89.7 | 92.7 | 97.3 |
| % HDN | 19.4 | — | 50.9 | 49.8 | — | 75.2 |
| % HDA | 36.7 | 54.5 | 65.7 | 94.0 | 99.0 | 97.0 |
| % HDM (V) | 41.5 | 51.w | 84.8 | 92.0 | 98.5 | 98.7 |
| (Ni) | 28.5 | 35.6 | 72.0 | 79.6 | 87.1 | 91.7 |

*Feed values obtained at the time product was evaluated.

The above-identified product, or effluent, of the first stage operation was fed to the second stage which contained a small pore aluminum phosphate catalyst, identified in Table 4, below:

TABLE 4

| Catalyst No. | Base | CoO, % | $MoO_3$, % | S.A., $m^2/g$ | Pore Diameter (Av.), A | Pore Volume, cc/g |
|---|---|---|---|---|---|---|
| 10 | $AlPO_4/Al_2O_3$ | 10.0 | 23.0 | 474 | 43 | 0.51 |

Process conditions and results are presented in Table 5, as shown on Page 19.

The product of the second stage operation, on distillation to obtain the gas oil fraction, clearly showed an overall increased yield of gas oil of lower nitrogen content. Thus, increased gas oil of lower nitrogen content is obtained with a process combination utilizing a first stage large pore catalyst with a second stage small pore aluminum phosphate catalyst. The large pore catalyst provides a lower metals content residuum for a given yield of hydrotreated bottoms. Conversion of 975°F.+ fraction ranged from 25 to 65% over the temperature range of 750°–800°F. as shown by Table 6 on Page 20 which presents a summary of the foregoing comparative data.

The following Example 2 exemplifies data further supporting the discovery that a high nitrogen product from a first stage asphaltene or 1050°F.+ hydroconversion zone (wherein the yield of gas oil is increased as contrasted with the original feed) can be subsequently treated in a second stage with small pore $AlPO_4/Al_2O_3$ catalyst to remove nitrogen.

TABLE 5

| Balance No. | 1 | 2 | 3 | 4 | 5 | 6 |
|---|---|---|---|---|---|---|
| Total Days on Oil | 1 | 2 | 3 | 6 | 8 | 10 |
| Process Conditions | | | | | | |
| Temperature, °F. | 500 | 600 | 700 | 723 | 750 | 800 |
| Pressure, psi | | | | 2250 | | |
| Feed Rate, W/Hr./W | | | | 0.69 | | |
| $H_2$ Gas Rate, SCF/Bbl. | | | | 4000 | | |
| Total Hours on Stream | 20 | 44 | 65 | 155 | 201 | 246 |
| Material Bal. ex Gas & Coke, Wt.% | 86.1 | 100.2 | — | 97 | 94.3 | 89.9 |
| Liquid Product Inspections | | | | | | |
| °API | 17.2 | 17.6 | — | 21.9 | 22.8 | 27.3 |
| Sulfur, Wt.% | 1.67 | 1.17 | — | 0.36 | 0.29 | 0.12 |
| Nitrogen, Wt.% | — | 0.352 | — | 0.224 | 0.183 | 0.084 |
| Asphaltenes, Wt.% | 7.72 | 5.6 | — | 3.07 | 1.24 | 1.91 |
| Metals, ppm | | | | | | |
| V | 169 | 167 | — | 83 | 46.1 | 5.0 |
| Ni | 28.6 | 25.2 | — | 16.3 | 12.0 | 3.2 |
| % HDS | 23.4 | 44.3 | — | 83.2 | 85.9 | 94.5 |
| % HDN | — | 8.6 | — | 41.8 | 52.9 | 78.2 |
| % HDA | 32.9 | 51.3 | — | 73.3 | 89.2 | 83.4 |
| % HDM (V) | 33.2 | 37.7 | — | 69.3 | 83.0 | 98.2 |
| (Ni) | 20.2 | 27.6 | — | 51.6 | 66.3 | 91.4 |

TABLE 5-continued

HYDROTREATING TIA JUANA RESIDUM
(0.69 W/Hr./W, 2200 psig, 4000 CF H₂/Bbl.)

| Catalyst Composition | One-Stage | | Two-Stage | | |
|---|---|---|---|---|---|
| | 7.0% CoO—24% MoO₃— Large Pore Alumina | | 50% of 7.0% CoO—24% MoO₃— Large Pore Al₂O₃ 50% of 7.0% CoO—24% MoO₃— Small Pore AlPO₄—Al₂O₃ | | |
| Treating Temperature, °F. | 750 | 800 | 750 | 800 | Feed |
| Product Distribution, Wt.% | | | | | |
| IBP-650°F. | 15.3 | 35.4 | 18.1 | 28.0 | 5.0 |
| 650-975°F. | 45.4 | 46.1 | 41.2 | 49.7 | 38.0 |
| 975°F.+ | 39.3 | 18.5 | 40.7 | 22.3 | 57.0 |
| % 975°F.+ Conversion | 31.0 | 67.5 | 28.5 | 60.8 | — |
| Nitrogen, ppm of 650–975°F. Fraction | 1014 | 684 | 206 | 416 | 1450 |
| Metals Content of 975°F.+ | | | | | |
| Vanadium, ppm | 10.4 | 20.0 | 113 | 23 | 485 |
| Nickel, ppm | 11.7 | 16.8 | 29.5 | 14.5 | 59.0 |

EXAMPLE 2

A first series of runs was thus conducted again using the Tia Juana atmospheric residuum feedstock described in Table 1, the reaction being conducted in a single stage reactor over catalyst compositions, characterized in Table 7, varied as regards pore diameter, metals loading, and the nature of the support, the reactions being conducted at temperatures ranging 600°–725°F., a space velocity of 0.64 W/Hr./W, a pressure of 1000 psig, and at a hydrogen rate of 4000 SCF/B.

TABLE 7

| Catalyst Number | Metals Composition, Wt.% | | | Base Composition | Physical Inspections[1] | | |
|---|---|---|---|---|---|---|---|
| | CoO | Ir | MoO₃ | | S.A. | P.V. | P.D., A |
| 1[2] | 7.0 | 0.3 | 24.0 | Al₂O₃ | 515 | 2.7 | 212 |
| 5[3] | 10.5 | | 36.0 | Al₂O₃ | 515 | 2.7 | 212 |
| 6 | 7.0 | | 24.0 | Al₂O₃ | 297 | 0.55 | 88 |
| 9[2] | 10.5 | | 23.0 | AlPO₄/Al₂O₃ | 333 | 0.28 | 34 |
| 10[2] | 10.0 | | 23.0 | AlPO₄/Al₂O₃ | 474 | 0.51 | 43 |
| 11[2] | 10.0 | | 23.0 | AlPO₄/Al₂O₃ | 468 | 0.49 | 42 |

[1]Values obtained on calcined base before metals addition.
[2]Half metals added as cogel and remainder added to calcined mixture.
[3]One-third metals added as cogel and remainder added to calcined mixture.

In contrasting percent hydrodenitrogenation (% HDN) with percent asphaltene conversion (% HDA), it is found that pore size is quite critical, considerably more hydroconversion of heavy components, (as measured by asphaltene content) being achieved with large pore catalyst than with small pore catalyst as depicted by reference to FIG. 1.

FIG. 1 depicts sets of curves drawn from data wherein hydrotreating catalysts otherwise similar but formed from different bases, i.e., (a) AlPO₄/Al₂O₃ of 40 angstrom average pore diameter, (b) Al₂O₃ of 60–80 angstrom pore diameter range, and (c) Al₂O₃ of 200–350 angstrom pore diameter range, were used in hydrotreating Tia Juana residuum at 600°–715°F, 0.64 W/Hr/W, 1000 psig, and 4000 SCF H₂/BBL, nitrogen removal being plotted versus asphaltene removal. These data show that the small pore AlPO₄/Al₂O₃ base catalyst was far more effective for nitrogen removal (HdN), at given asphaltene conversion (HdA), than either the intermediate or large pore diameter Al₂O₃ base catalysts, respectively. The reason for this is that the larger asphaltene molecules are excluded from the smaller pores such that the active sites remain available for hydrodenitrogenation of the gas oil feed. At the other extreme, the catalyst of largest pore size diameter takes in more of the large molecules so that active sites are more readily poisoned, and rendered less effective for hydrodenitrogenation of the gas oil feed.

Figure 2:
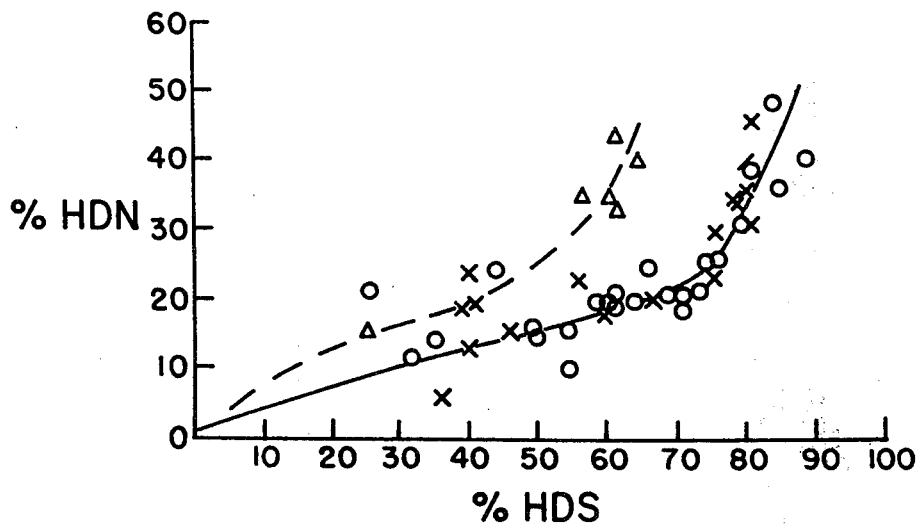

These data, depicted in FIG. 2 attached, also show that small and large pore catalysts are equivalent when comparing nitrogen removal vis-a-vis sulfur removal. the AlPO₄/Al₂O₃ base catalysts, however, show far higher nitrogen removal (% HDN) for a given sulfur reduction (% HDS).

It is thus shown that the large pore catalyst is admirably suitable for conversion of asphaltenes and 1050°F.+ materials to gas oils and, despite the increased concentration of nitrogen that results, the nitrogen content can be reduced by passage of the product of the initial reaction with the large pore catalyst over an AlPO₄/Al₂O₃ catalyst.

It is apparent that various modifications and changes can be made without departing the spirit and scope of the present invention.

Having described the invention, what is claimed is:
1. In a process for upgrading the 1050°F.+ materials of a metals containing heavy crude or residua by conversion of the 1050°F.+ materials to produce 1050°F.– materials, the improved combination comprising
   contacting said heavy crude or residua in an initial reaction zone, in the presence of added hydrogen, with a catalyst characterized as comprising a composite of from about 5 to about 30 percent of a Group VIB metal, or compound thereof, from about 1 to about 12 percent of a Group VIII metal, or compound thereof, or admixture of said Group VIB and Group VIII metals, or compounds thereof, and a porous inorganic oxide support, said catalyst including a combination of properties comprising at least about 50 percent of its total pore volume of absolute pore diameters ranging from about 200A to about 300A, and less than about 20 percent of its total pore volume are of absolute pore diameters ranging from 0 to about 100A, a surface area ranging at least about 200 m²/g to about 600 m²/g and a pore volume ranging from about 0.8 cc/g to about 3.0 cc/g, at severity sufficient to convert at least about 30 percent of the 1050°F.+ material to 1050°F.− material, while removing at least about 75 percent of the heavy metals from the feed, and contacting product of said initial reaction zone in a subsequent reaction zone, in the presence of added hydrogen, with a catalyst which contains a metal hydrogenation component, and above about 30 percent aluminum phosphate, based on the weight of the catalyst (dry basis) exclusive of the hydrogenation component, said catalyst having at least about 90 percent of its total pore volume of absolute diameter within the range of about 15A to about 100A, a surface area ranging from about 200 m²/g to about 600 m²/g and a pore volume ranging from about 0.25 to about 0.75 cc/g, and the reaction is conducted at severities sufficient to hydrodenitrogenate the 1050°F.− fraction of the product of said initial reaction zone fed thereto to the extent of at least about 30 percent, based on the weight of total nitrogen contained in the reaction mixture, the nitrogen being eliminated as ammonia.

2. The process of claim 1 wherein from about 40 percent to about 60 percent of the 1050°F.+ material is converted to 1050°F.− in the initial reaction zone, and from about 80 percent to about 95 percent of the metals are removed from the feed.

3. The process of claim 1 wherein the feed to the initial reaction zone is characterized as follows:

| | |
|---|---|
| Gravity, °API | −5 to 20 |
| Heavy Metals, ppm | 5–1000 |
| 1050°F.+, Wt.% | 10–100 |
| Asphaltenes (C₅ insoluble), Wt.% | 5–50 |
| Nitrogen, Wt.% | 0.1–5 |
| Con Carbon, Wt.% | 5–50 |

4. The process of claim 1 wherein the product of the initial reaction zone is characterized as follows:

| | |
|---|---|
| Gravity, °API | 14–30 |
| Heavy Metals, ppm | 10–100 |
| 1050°F.+, Wt.% | 10–50 |
| Asphaltenes (C₅ insoluble), Wt.% | 3–20 |
| Nitrogen, Wt.% | 0.07–2.5 |
| Con Carbon, Wt.% | 3–20 |

5. The process of claim 1 wherein the conditions of the reaction conducted in the initial reaction zone are characterized as follows:

| | |
|---|---|
| Temperature, °F. (E.I.T.) | |
| Start-of-Run | 700 |
| End-of-Run | 850 |
| Pressure, Psi | 2000–10,000 |
| Hydrogen Rate, SCF/B | 3000–20,000 |
| Space Velocity, LHSV | 0.25–5.0 |

6. The process of claim 1 wherein the catalyst comprises a combination of properties wherein at least about 75 percent of the total pore volume of said catalyst of the initial reaction zone is of pore diameter ranging from about 200A to about 300A and less than about 10 percent of its total pore volume are of absolute pore diameters ranging from 0 to about 100A, and has a surface area ranging at least about 250 m²/g to about 450 m²/g and a pore volume ranging from about 1.1 cc/g to about 1.9 cc/g.

7. The process of claim 1 wherein the Group VI metal of the catalyst is molybdenum, and the Group VIII metal of the catalyst is cobalt.

8. The process of claim 1 wherein, of the total pore volume of the catalyst of the initial reaction zone, the pore size diameters thereof are as follows:

| | |
|---|---|
| 0–100A | <10% |
| 200–300A | >50% |
| 400A+ | <20% |

9. The process of claim 1 wherein, of the total pore volume of the catalyst of the initial reaction zone, the pore size diameters thereof are as follows:

| | |
|---|---|
| 0–100A | <5% |
| 200–300A | >75% |
| 400A+ | <10% |

10. The process of claim 1 wherein said catalyst of said initial reaction zone comprises from about 10 to about 20 percent of a Group VIB metal, or compound thereof, and from about 4 to about 8 percent of a Group VIII metal, or compound thereof, or admixture of said Group VIB and Group VIII metals, or compounds thereof.

11. The process of claim 10 wherein the product of the reaction is characterized as follows:

| | |
|---|---|
| Gravity, °API | 14–30 |
| Heavy Metals, ppm | 10–100 |
| 1050°F.+, Wt.% | 10–50 |
| Asphaltenes (C₅ insoluble), Wt.% | 3–20 |
| Nitrogen, Wt.% | 0.07–2.5 |
| Con Carbon, Wt.% | 3–20 |

12. The process of claim 10 wherein the product of the reaction is characterized as follows:

| | |
|---|---|
| Gravity, °API | 15–25 |
| Heavy Metals, ppm | 40–80 |
| 1050°F., Wt.% | 25–40 |
| Asphaltenes (C₅ insoluble), Wt.% | 5–15 |
| Nitrogen, Wt.% | 0.25–1.5 |
| Con Carbon, Wt.% | 5–10 |

13. The process of claim 1 wherein said subsequent reaction zone is operated at severities sufficient to hydrodenitrogenate, and eliminate, from about 40 percent to about 90 percent of the total nitrogen of the 1050°F.− portion of the reaction mixture.

14. The process of claim 1 wherein the hydrodenitrogenated product of said subsequent reaction zone is characterized as follows:

| | |
|---|---|
| Gravity, °API | 18–30 |

-continued

| | |
|---|---|
| Heavy Metals (Ni & V), ppm | <1 |
| Nitrogen, ppm | 50–500 |
| Con Carbon, Wt.% | 0.5 to 1.0 |

15. The process of claim 1 wherein the product of the reaction is characterized as follows:

| | |
|---|---|
| Gravity, °API | 20–28 |
| Heavy Metals, ppm | <0.05 |
| Nitrogen, ppm | 100–400 |
| Con Carbon, Wt.% | <0.5 |

16. The process of claim 1 wherein the conditions of the reaction are characterized as follows:

| | |
|---|---|
| Temperature, °F. (E.I.T.) | |
| Start-of-Run | 600 |
| End-of-Run | 800 |
| Pressure, psi | 500–5000 |
| Hydrogen Rate, SCF/B | 1000–10,000 |
| Space Velocity, LHSV | 0.2–5 |

17. The process of claim 1 wherein the conditions of the reaction are characterized as follows:

| | |
|---|---|
| Temperature, °F. (E.I.T.) | |
| Start-of-Run | 700 |
| End-of-Run | 750 |
| Pressure, psig | 1500–3000 |
| Hydrogen Rate, SCF/B | 2000–4000 |
| Space Velocity, LHSV | 0.5–2 |

18. The process of claim 1 wherein the catalyst contains from about 30 percent to about 100 percent aluminum phosphate.

19. The process of claim 1 wherein the catalyst contains from about 70 percent to about 80 percent aluminum phosphate.

20. The process of claim 1 wherein the alumina phosphate catalyst comprises at least about 99 percent of its total pore volume of absolute diameter within the range of from about 15A to about 100A, a surface area ranging from about 350 m$^2$/g to about 500 m$^2$/g and a pore volume ranging from about 0.4 to about 0.8 cc/g.

* * * * *